H. M. HOWELL.
DEMOUNTABLE RIM.
APPLICATION FILED JULY 11, 1921.
1,437,105.
Patented Nov. 28, 1922.
2 SHEETS—SHEET 1.
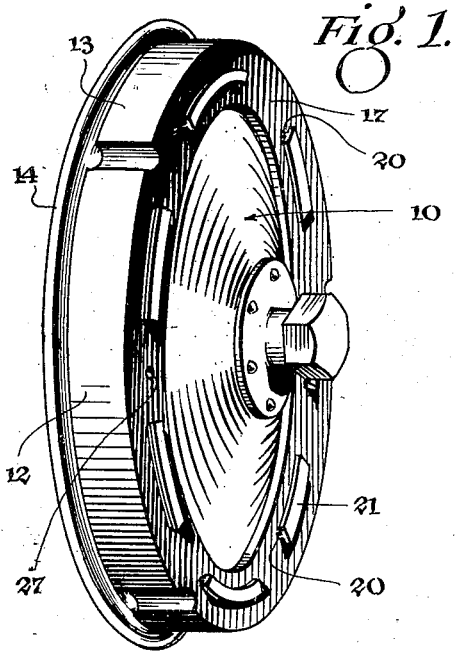
Fig. 1.
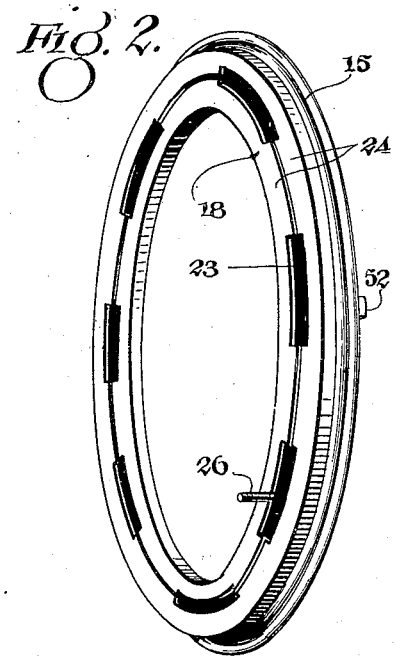
Fig. 2.
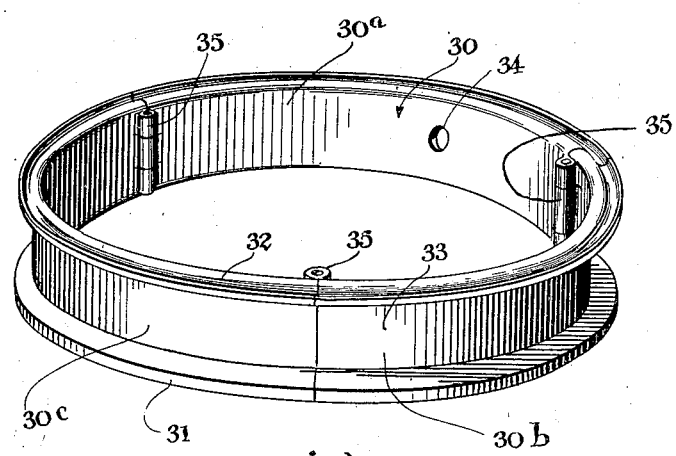
Fig. 3.
Fig. 9.
WITNESSES
INVENTOR
Henry M. Howell.
BY
ATTORNEYS H. M. HOWELL.
DEMOUNTABLE RIM.
APPLICATION FILED JULY 11, 1921.
1,437,105.
Patented Nov. 28, 1922.
2 SHEETS—SHEET 2.
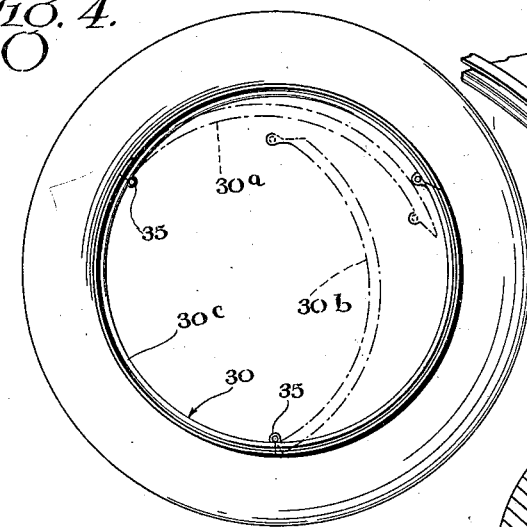
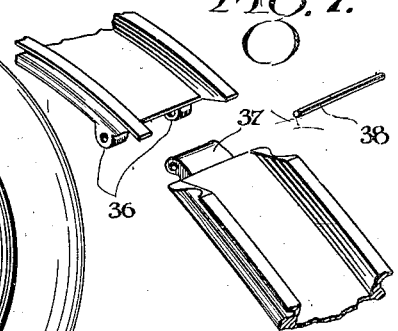
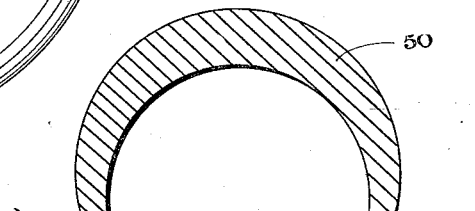
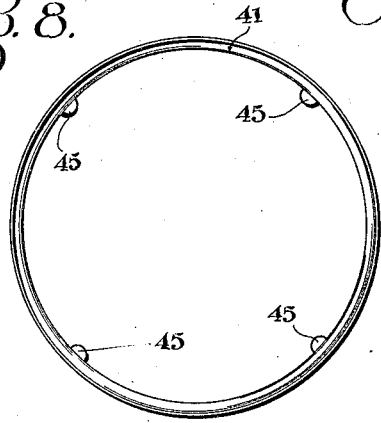
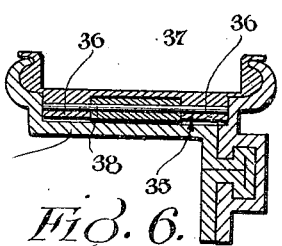
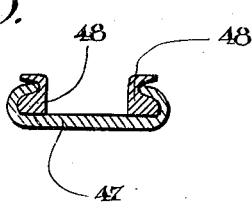
WITNESSES
INVENTOR
Henry M. Howell.
BY
ATTORNEYS Patented Nov. 28, 1922.

1,437,105

UNITED STATES PATENT OFFICE.

HENRY M. HOWELL, OF MONROE, LOUISIANA, ASSIGNOR, BY DIRECT AND MESNE ASSIGNMENTS, TO INSTANT CHANGEABLE TIRE RIM COMPANY, INC., OF MONROE, LOUISIANA, A CORPORATION.

DEMOUNTABLE RIM.

Application filed July 11, 1921. Serial No. 483,922.

*To all whom it may concern:*

Be it known that I, HENRY M. HOWELL, a citizen of the United States, and a resident of Monroe, in the parish of Ouachita and State of Louisiana, have invented certain new and useful Improvements in Demountable Rims, of which the following is a specification.

The present invention relates to an improvement in demountable rims of the type forming the subject-matter of my prior Patent No. 1,383,810 dated July 5, 1921.

The object of the invention is to provide a rim of this character adapted to be utilized in conjunction with a spare tire pumped up and ready for service whereby any driver of an automobile or other vehicle may effect a change of tires without the necessity of exercising a great degree of mechanical skill or of expending a great degree of work or strength in order to carry out the operation.

Another object is to provide a rim of this character which is of simple and durable construction, ready and reliable in operation and easy and inexpensive to manufacture.

Other objects and advantages of the invention reside in certain novel features of construction, combination and arrangement of parts which will be hereinafter more fully described and particularly pointed out in the appended claim, reference being had to the accompanying drawings forming part of this specification, and in which:

Figure 1 is a perspective view illustrating the rim with the outer retaining flange removed;

Figure 2 is a perspective view of the outer retaining flange;

Figure 3 is a perspective view of the demountable rim.

Figure 4 is a side elevational view, illustrating the tire mounted on the demountable rim;

Figure 5 is a view in transverse vertical section through the rim, intermediate the hinges of the demountable rim;

Figure 6 is a similar view in section, taken through one of the hinges of the demountable rim;

Figure 7 is a fragmentary perspective view, illustrating the separable hinge of the demountable rim;

Figure 8 is a view in side elevation of a rigid demountable rim;

Figure 9 is a view in transverse section of the solid demountable rim; and

Figure 10 is a sectional view, showing the fillet rings in position on the rim.

Referring to the drawings, and more especially to Figures 1 to 7, inclusive, the numeral 10 designates a wheel which may be of any suitable type, such as a wire wheel or the like but which is preferably a disk wheel.

A rim, designated generally at 12, is carried by the wheel and includes a base section 13 having an inner retaining flange 14 fixed thereto, preferably formed integral therewith. An outer removable retaining flange 15 is provided and is adapted to be associated with the base section to complete the rim.

Interlocking means is provided for releasably securing the removable retaining flange to the base section so as to complete the rim assembly. The interlocking means includes a locking plate 17 integral with the base section of the rim and a cooperating locking plate 18 integral with the outer retaining flange 15. Spaced arcuate locking flanges 20 are carried by the locking plate 11, the outer ends of each of the locking flanges being provided with enlarged heads 21. The locking plate 18 is provided with a circumferential channel 23, the outer sides of the upper and lower walls of the channel having arcuate shoulders 24 spaced circumferentially to provide for the entrance of the enlarged heads 21 of the locking flanges 20 into the channel 23 and spaced radially to accommodate the locking flange 20 when the outer plate 18 has been moved circumferentially with respect to the plate 17 so as to confine the enlarged heads 21 behind the shoulders 24.

Means is provided for preventing circumferential movement of the locking plate 18 relative to the locking plate 17 when the locking plates are assembled and includes a bolt 26 which is inserted in the registering openings 27 provided in the locking plates 17 and 18, respectively.

A demountable rim designated generally at 30, is provided and includes fillet rings 31 and 32 and a connecting web 33 preferably integral with the fillet rings. The demountable rim may be collapsible and for this purpose it may be formed in three sections, designated at 30ª, 30ᵇ and 30ᶜ, the sections being pivotally connected to each other by means of hinges 35. Each of the hinges 35 includes a pair of spaced ears 36 carried by one of the sections and a single ear 37 carried by the adjacent section and adapted to be received between the members of the pair of ears 36 in the assembly and pivotally connected therewith by means of a hinge pin 38. At least one of the hinged pins 38 is readily removable so that one of the hinges constitutes a separable hinge to facilitate collapsing of the demountable rim in mounting or demounting the tire thereon. The demountable rim 30 is of light weight and is adapted to support a tire pumped up and ready for service either when the tire carrier is organized with the rim or when it is used to carry a spare tire pumped up and ready for service. When organized with the rim, the fillet ring 31 snugly engages the retaining flange 14 and the fillet ring 32 engages the flange 15 and the web 33 rests upon the base section 13 of the rim so that the tire carrier is completely supported and reinforced by the rim in such manner that the stresses incident to the support of the vehicle and to travel of the vehicle are entirely taken up by the rim, the demountable rim being simply interposed between the rim and the tire and not serving to take the stresses.

In order that the fillet rings and the retaining flanges may be snugly engaged or abutted and that these flanges may take up entirely all of the stresses, the flanges are inwardly curved to provide seats or cavities designated at 14ª and 15ª, respectively, and the fillet rings include outwardly extending or bulged portions, designated at 31ª and 32ª, respectively, which accurately conform to and are snugly received in the cavities or seats of the flanges. The fillet rings also include outwardly extending shoulders, designated at 31ᵇ and 32ᵇ, respectively, which overlap the edges of the flanges in the assembly, as clearly shown in Figures 5 and 6.

Cooperating means between the demountable rim and the rim for preventing relative movement is provided, and in the embodiment above described the hinges 35 constitute stop lugs for this purpose, the base section 13 of the rim being provided with inwardly-extending bosses 40 defining recesses for the reception of such lugs, as clearly shown in Figure 6.

In lieu of the collapsible form of demountable rim a solid or rigid form thereof may be provided, as designated at 41 in Figure 8. Such a form of demountable rim includes rings 42 and 43 and a connecting web 44 as in the other embodiment. With the rigid or solid form of carrier solid stop lugs 45 are provided in lieu of the hinges, these solid stop lugs being received in posts provided in the base section of the rim. With the solid or rigid form of demountable rim it is necessary in mounting or demounting the tire to pinch it over the rings of the demountable rim.

If desired the demountable rim may be used only with the spare tire although this is not to be preferred, and in this event the rim designated at 47 in Figure 9 receives a pair of fillet rings 48 which adapt it to support the tire.

The tire which is mounted upon the demountable rim is designated at 50 and the tire carrier is provided with an opening 34 to permit of the insertion of the valve stem of the demountable rim. The base section of the rim and the outer locking plate thereof are also suitably slotted to accommodate the valve stem.

Impact lugs 52 are provided on the outer retaining flange and provide means whereby the outer tire retaining flange may be readily rotated in assembling and disassembling it.

In practice, when it is necessary to change a tire, the bolt 26 is removed and the outer retaining flange is rotated until the locking flanges and their heads are disposed in the open spaces between the locking shoulders 24 at which time the outer retaining flange may be removed. The tire is then grasped and the tire and its carrier are pulled from the rim. The spare tire, mounted on another tire carrier is then slid into position, the outer retaining flange is reassembled with the rim, the bolt 26 again inserted and the change has been completed.

In demounting the tire from the demountable rim the removable hinge pin 38 is disassociated from its hinge and the sections 30ᵇ and 30ª are swung inwardly, as indicated in dotted and dash lines in Figure 4. This permits a ready removal of the tire. When the new tire is being positioned on the demountable rim, the sections are positioned, as indicated in dotted and dash lines in Figure 4 until the tire is placed on the section 30 and overlies the sections 30ª and 30ᵇ, these latter sections being subsequently swung out against the tire so that the ears 36 and 37 are alined. The hinged pin 38 is then inserted and the tire is then mounted on the demountable rim.

I claim:

In a device of the character described, a rim including a base section and retaining flanges, a demountable rim including rings abutting the retaining flanges and a web connecting the rings and seated on the base section, said web and said rings being completely reinforced and supported on said base section and said flanges respectively, said demountable rim including a plurality of sections, hinges pivotally connecting said sections, each of said hinges including a pair of ears carried by one section and a single ear carried by the other section and arranged between the members of the associated pair of rings, and a hinge pin associated with said ears, one of said hinges having a removable hinge pin to provide a separable hinge whereby the tire carrier may be collapsed when off the rim, said base section having a plurality of inwardly extending bosses defining recesses receiving the hinges, the hinges constituting lugs cooperable with the recesses for preventing relative circumferential movement of the demountable rim relative to said ring.

HENRY M. HOWELL.